United States Patent
Tiller et al.

(10) Patent No.: US 9,236,074 B1
(45) Date of Patent: Jan. 12, 2016

(54) MULTI-DISK WRITER WITH INDIVIDUAL HEAD POSITIONING

(71) Applicant: Seagate Technology LLC, Cupertino, CA (US)

(72) Inventors: Michael R. Tiller, Waconia, MN (US); Barmeshwar Vikramaditya, Eden Prairie, MN (US); Yongjun Hou, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/605,063

(22) Filed: Jan. 26, 2015

(51) Int. Cl.
*G11B 21/02* (2006.01)
*G11B 5/60* (2006.01)

(52) U.S. Cl.
CPC .................................. *G11B 5/6005* (2013.01)

(58) Field of Classification Search
None
See application file for complete search history.

(56) References Cited

U.S. PATENT DOCUMENTS

| | | | |
|---|---|---|---|
| 6,624,963 B2 | 9/2003 | Szita | |
| 6,977,791 B2 * | 12/2005 | Zhu et al. | 360/75 |
| 7,050,259 B1 | 5/2006 | Guo et al. | |
| 7,158,330 B2 * | 1/2007 | Morris et al. | 360/75 |
| 7,639,447 B1 | 12/2009 | Yu et al. | |
| 7,768,736 B2 * | 8/2010 | Belmont et al. | 360/75 |
| 7,880,987 B2 | 2/2011 | Belmont et al. | |
| 8,300,348 B1 * | 10/2012 | Liu et al. | 360/75 |
| 9,019,650 B1 * | 4/2015 | Shan et al. | 360/75 |

OTHER PUBLICATIONS

Chen et al., "Spiral Servo Writing in Hard Disk Drives Using Iterative Learning Based Tracking Control", the 18th World Congress of the International Federation of Automatic Control (IFAC), Aug. 28-Sep. 2, 2011, 7 pages.

* cited by examiner

*Primary Examiner* — K. Wong
(74) *Attorney, Agent, or Firm* — Hollingsworth Davis, LLC

(57) ABSTRACT

A system comprises a disk writer servo head and a controller. The disk writer servo head is configured to be positioned by a micro actuator. The disk writer servo head is also configured to substantially, continuously alternate between reading a first servo pattern and writing a second servo pattern until a disk is substantially, completely servo written. The first servo pattern establishes a first position of the disk writer servo head and the second servo pattern establishes a second position of the disk writer servo head. The controller is configured to control the operation of the disk writer servo head. The controller is also configured to compare the first and second positions to establish a position error. The micro actuator is configured to reposition the disk writer servo head in response to the position error prior to a next reading.

22 Claims, 6 Drawing Sheets

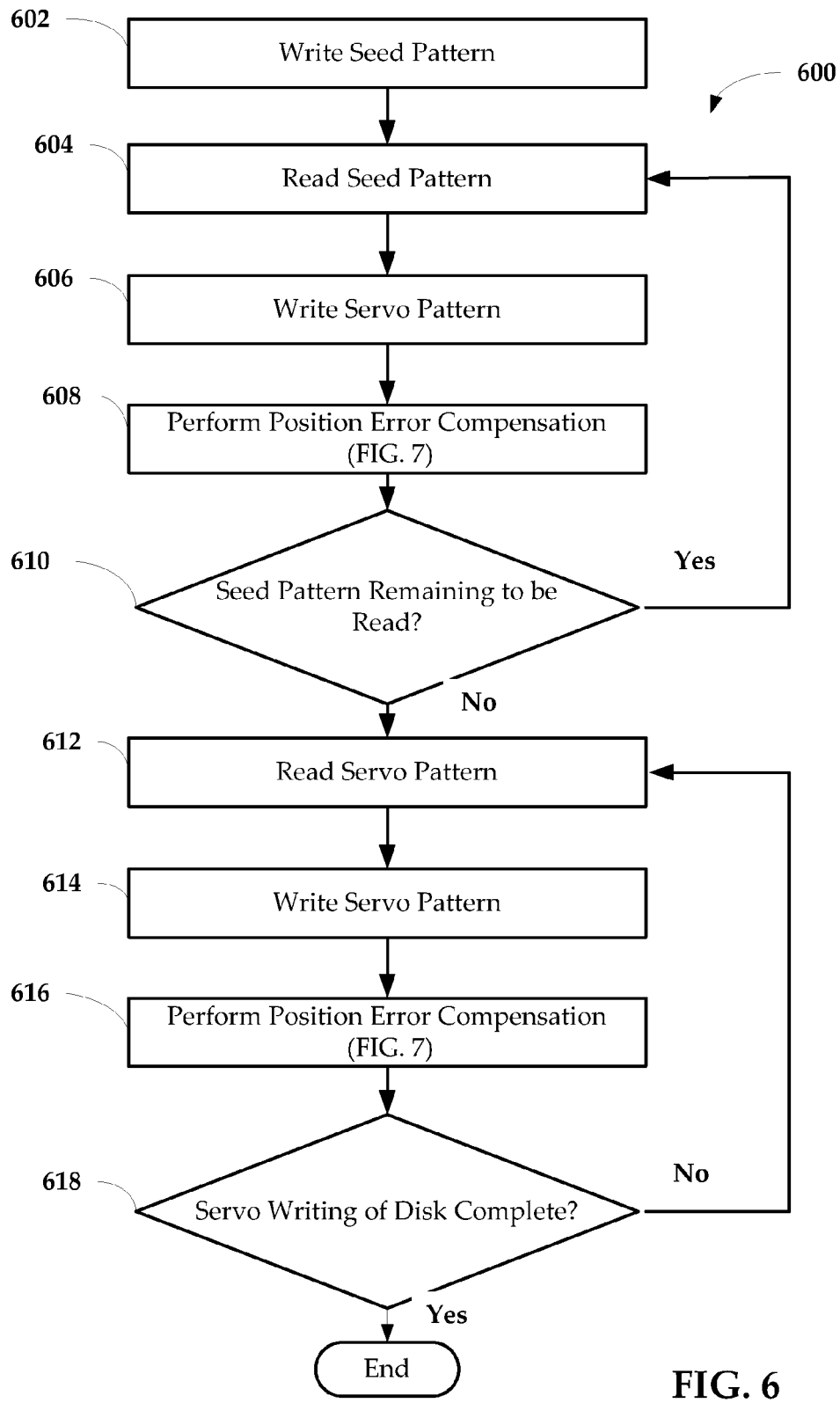

MULTI-DISK WRITER WITH INDIVIDUAL HEAD POSITIONING

SUMMARY

A system of the present disclosure comprises a disk writer servo head and a controller. The disk writer servo head is configured to be positioned by a micro actuator. The disk writer servo head is also configured to substantially, continuously alternate between reading a first servo pattern and writing a second servo pattern until a disk is substantially, completely servo written. The first servo pattern establishes a first position of the disk writer servo head and the second servo pattern establishes a second position of the disk writer servo head. The controller is configured to control the operation of the disk writer servo head. The controller is also configured to compare the first and second positions to establish a position error. The micro actuator is configured to reposition the disk writer servo head in response to the position error prior to a next reading.

A method of the present disclosure comprises alternating, without delay, between reading a first servo pattern with a disk writer servo head and writing a second servo pattern with the disk writer servo head until a disk has been substantially completely servo written. The reading of the first servo pattern establishes a first position of the disk writer servo head and the writing of the second servo pattern establishes a second position of the disk writer servo head. The method further comprises comparing the first and second positions to establish a position error and repositioning the disk writer servo head in response to the position error prior to the next reading.

Another system of the present disclosure comprises a plurality of disk writer servo heads in a multi-disk writer and a controller. Each of the plurality of disk writer servo heads is configured to substantially, simultaneously be positioned by a respective micro actuator. Each of the plurality of disk writer servo heads is additionally configured to substantially, simultaneously and substantially, continuously alternate between reading a first servo pattern and writing a second servo pattern until a disk, respective to each of the disk writer servo heads, has been substantially, completely servo written. The reading establishes a first position of the respective disk writer servo head and the writing establishes a second position of the respective disk writer servo head. The controller is configured to control the operation of the plurality of disk writer servo heads and is additionally configured to compare the first and second position to establish a position error for each of the respective disk writer servo heads. Each of the micro actuators is configured to reposition its respective disk writer servo head in response to the position error prior to a next reading.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 6 is flow chart of a method in accordance with an example embodiment.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Hard disk drives are data storage devices that store digital data in magnetic form on a rotating storage medium. Modern disk drives comprise one or more rigid disks that are coated with a magnetizable medium and mounted on the hub of a spindle motor for rotation at a high speed. Information is stored on the disks in a plurality of generally concentric circular tracks typically by an array of transducers ("heads") mounted to a radial actuator or actuator arm for movement of the heads relative to the disks. The heads are used to transfer data between a desired track and a host computer. During a write operation data is written by the head onto the disk track. During a read operation the head reads the data previously written onto the disk track and transfers the information to the host computer. Important to both of these operations is the accurate and efficient positioning of the head relative to the center of the desired track. Head positioning within a desired track is dependent on head-positioning servo-patterns, i.e., a pattern of data bits used to maintain optimum track spacing and sector timing.

Figure 1:
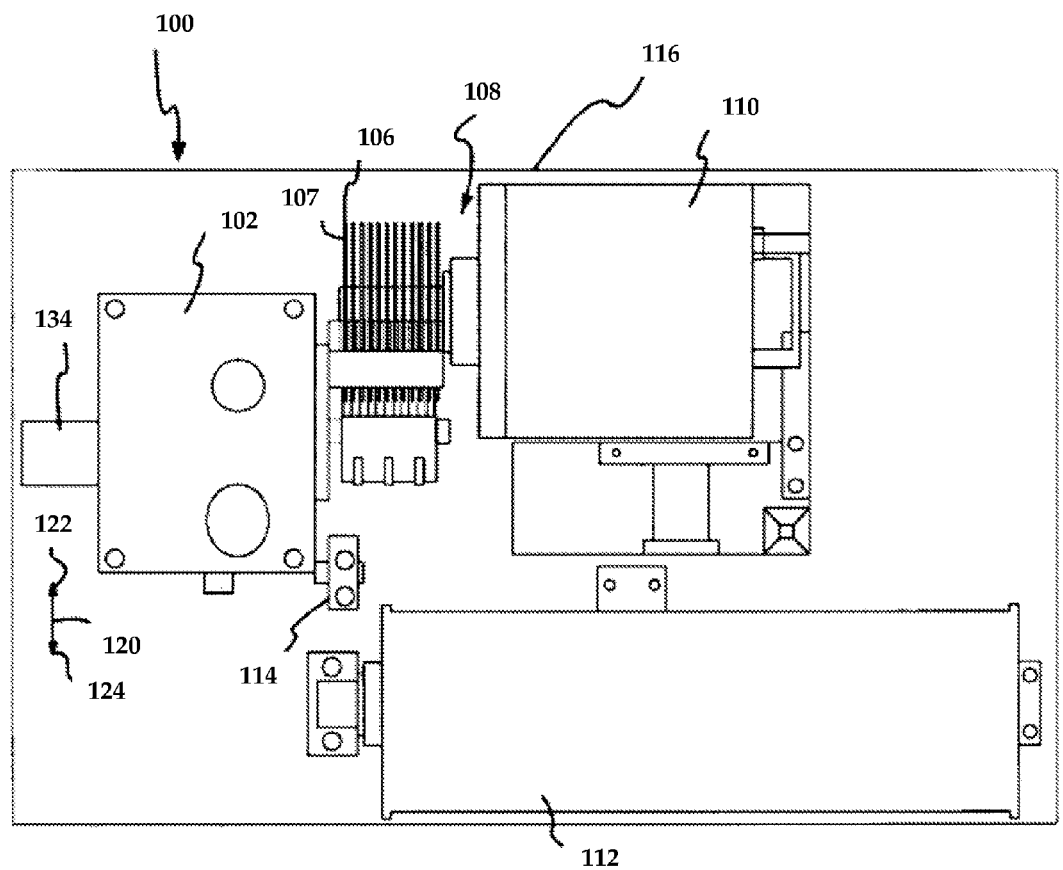
FIG. 1 is a plan view of an example multi-disk writer (MDW) configured to incorporate a servo head and control scheme according to an example embodiment
Figure 2:
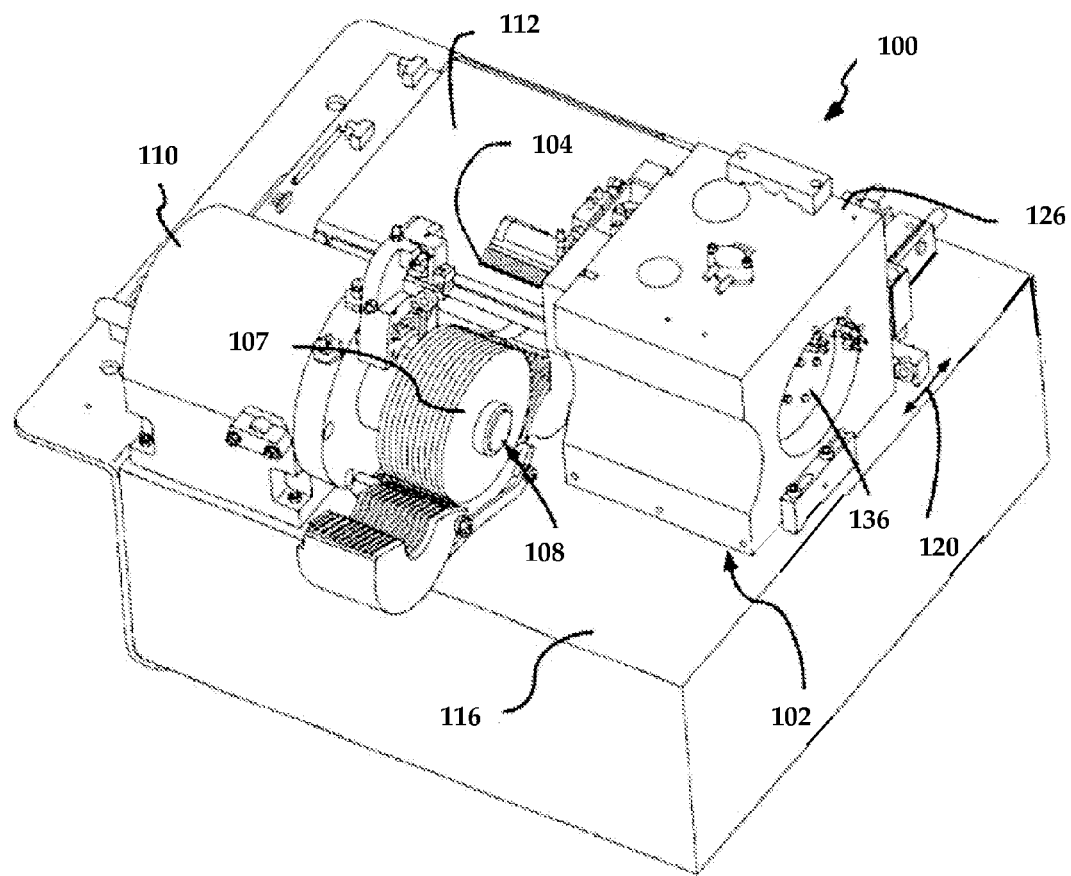
FIG. 2 is a perspective view of the MDW of FIG. 1.
Figure 3:
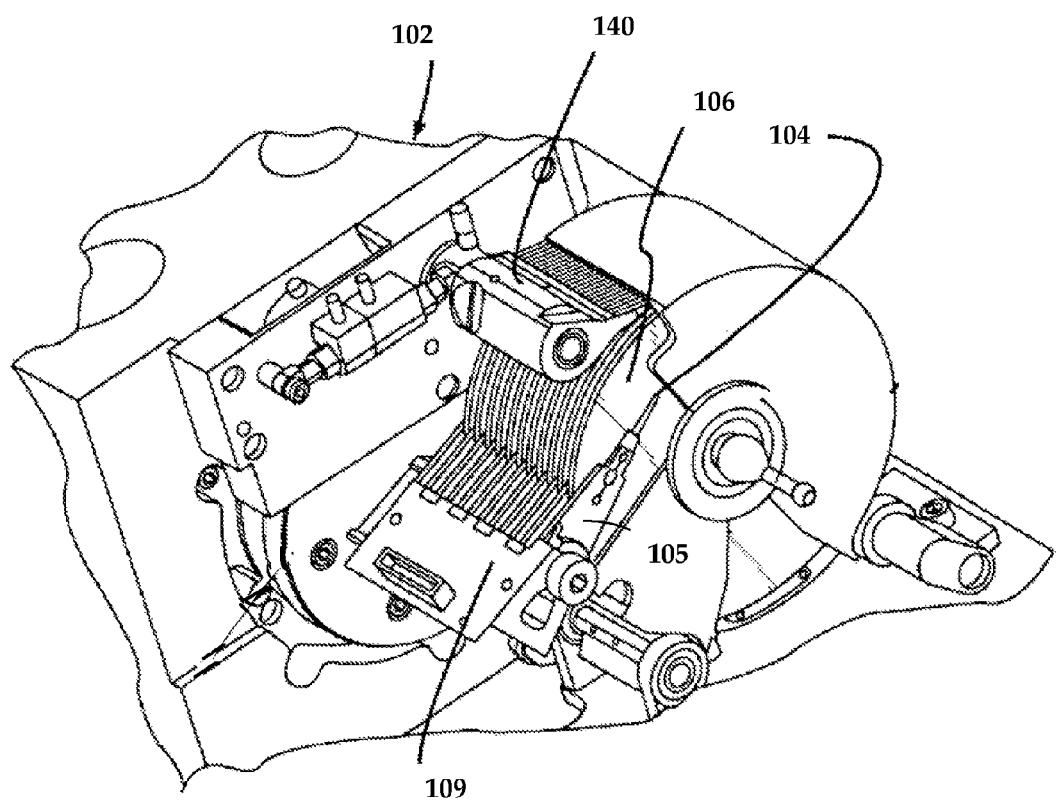
FIG. 3 is a close-up perspective view of the MDW of FIG. 2 with a disk pack on the spindle motor hub with the spindle motor removed.

There is an ever-continuing need to develop cost effective disk drives capable of storing more data onto existing or smaller sized disk surfaces. One potential way of increasing data storage on a disk surface is to increase the recording density of the disk surface by increasing the track density (tracks per millimeter (tpmm)). Increased track density requires more closely spaced, narrow tracks, which in turn requires increased accuracy in recording servo-patterns onto the target disk surface. One manner of recording servo-patterns is through the use of a multi-disk writer (MDW). An example configuration of an MDW is illustrated in FIGS. 1-3.

As shown, MDW 100 generally includes an actuator assembly 102 for moving the servo heads 104 necessary for recording servo patterns onto a stack of target disks 106 (each with a disk surface 107). The servo heads 104 are connected to actuator arms 105, which comprises a portion of an E-block assembly 109. A spindle hub assembly 108 attached to a spindle motor 110 vertically positions one or more target discs 106 for servo pattern writing. A vacuum chuck 112 rigidly secures the actuator assembly 102 in a desired position for servo track writing and fastens the spindle hub assembly to the spindle motor 110. An MDW encoder-based servo control system 114 measures the angular displacement and consequent positioning of the servo-recording heads 104 of the actuator assembly 102 for servo pattern recording. The components of the MDW 100 are fastened to a flat, rigid base or platform 116.

The actuator assembly 102 is directly connected to the platform 116 via a vacuum chuck for lateral movement of the actuator assembly 102 when air is applied, as indicated by arrow 120, over the platform 116 between a servo recording position 122 and a disk loading and unloading position 124. The actuator assembly 102 is shown in the disk unloading position 124 in FIG. 2 and shown in the servo recording position 122 in FIGS. 1 and 3.

The spindle hub assembly 108 vertically positions the disks 108 for the simultaneous writing of a servo pattern onto each disk by the servo heads 104. In writing the servo pattern, the MDW 100 may utilize a previously written track as a relative position reference. The first servo track that is written may use a pre-established seed track proximate the inner diameter of the disk as its reference. Alternatively, the pre-established seed track may be at the outer diameter of the disk. In general, the MDW encoder-based servo control system presents the relative position reference, as read by the servo head 104, to a controller (not shown). The controller, configured to execute logic/software, may comprise, for example, a dedicated MDW single board computer, an Aperio computer performing media certification, a standalone programmable controller, or other appropriate hardware. The controller compares the position reference to the actual position of the servo head 104, which is provided by the encoder. The controller then makes adjustments to the actuator assembly 102 as the controller constantly strives to keep the difference between the position reference and the actual position of the servo heads 104 to a minimum. Generally, any position correction adjustment is applied to the actuator assembly 102, which results in the simultaneous movement of all actuator arms 105 and all servo heads 104 through use of the single actuator.

Figures 4, 5:
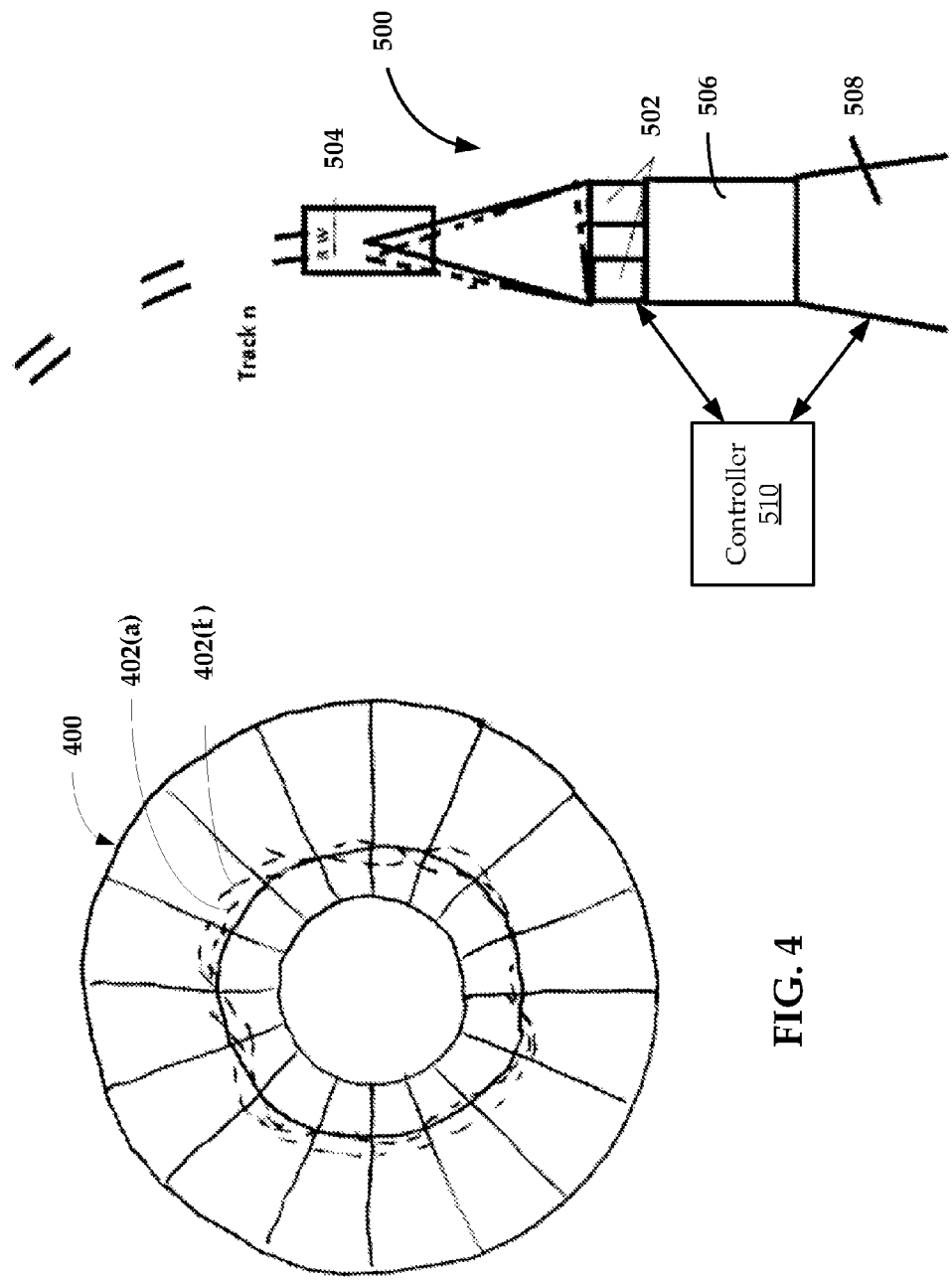
FIG. 4 is an illustration of track squeeze.
FIG. 5 is an MDW servo head in accordance with an example embodiment.

While the positioning of MDW servo heads by a single actuator has provided written servo tracks with an acceptable level of accuracy, the desire for increased track density and, therefore, more closely spaced, narrow tracks requires an increased accuracy in servo track writing that may not be adequately met by a single actuator. Notably, a single actuator MDW uses a non-collocated position reference (e.g., an encoder) that cannot detect spindle disturbance, disk flutter, actuator arm motion, etc., which can subject the written servo tracks to an inaccuracy defined as "track squeeze." An example of "track squeeze" is illustrated in FIG. 4 where a disk surface 400 displays irregularly shaped, circular servo tracks 402(*a*) and 402(*b*). Repeatable runout (RRO) errors written into a particular servo track may cause this shape irregularity that differs from one track to the next across the disk surface. The result in the mismatch in geometric shape between adjacent tracks causes the track squeeze. If the geometric data of one servo track is followed during a data write operation, the data written may result in an impingement and disruption of data written on an adjacent servo track thereby squeezing the usable width of the data track for writing.

Beyond track squeeze, the MDW inherently includes other factors that lead to inaccuracies in servo track writing. For example, the large actuator assembly of the MDW has a high inertia and, therefore, limited servo bandwidth regardless of the position reference signal used. Further, the motion of each disk in the MDW is different due to disk flutter and spindle rocking motion. These inaccuracies cannot be compensated for on a surface-by-surface basis with the single actuator provided by the MDW.

Thus, the present disclosure provides for an MDW that utilizes micro actuators for each MDW servo head in concert with a micro actuator servo control system. The use of micro actuators enables the MDW control system to see the actual displacement of each servo head while writing servo tracks and to move the servo head in the cross-track direction to compensate for the displacement of the write transducer of the servo head with respect to the disk on a media surface-by-surface basis. While the actuator of the MDW can provide coarse positioning of the MDW servo head each micro actuator can provide fine positioning, for example, less than three track widths, less than one track width, etc., of its respective MDW servo head on a head-by-head basis. FIG. 5 illustrates a portion of a modified MDW actuator assembly 500 according to an example embodiment wherein a micro actuator 502 is provided for each of the MDW servo heads 504 (only one servo head 504 is shown for simplicity). In this configuration, each micro actuator comprises a pair of piezoelectric transducers (PZTs) 502, however, other appropriate micro actuators may be used. The micro actuator 502 is coupled to the actuator arm 506 which is coupled to MDW E-block (actuator) 508. A controller 510 is configured to receive signals from and provide signals to the actuator and micro actuator. The controller may additionally be configured to execute the control loop (described further below) for position error compensation of the actuator and/or micro actuators.

Also noted within FIG. 5 is the location of the read transducer ft and write transducer W within the MDW servo head 504 and a track N. FIG. 5 further illustrates how windage or displacement of the servo head 504, indicated by the triangular dashed line, can be compensated to the desired position, indicated by the solid triangular line, by the micro actuators.

In one example embodiment, the control loop of the MDW of the present disclosure operates in accordance with the flow chart of FIG. 6. Initially, the MDW is configured to write a seed pattern 602 with the write transducer of the MDW servo head to establish a base for subsequent servo writing. With the seed pattern established, the MDW is configured to write the servo pattern. To actually write the servo pattern, the read transducer of the NOW servo head reads the seed pattern 604 which provides a reference position (REF) for the write transducer of the MDW servo head. The write transducer writes the servo pattern 606 while providing an actual position (POS) of the write transducer; the POS represents the sum total of the positions of the actuator and micro actuator of the MDW servo head. The position feedback loop 700 of FIG. 7 then utilizes REF and POS to determine a position error signal (PES) enabling the controller to adjust the position of the MDW servo head, responsive to the PES, before the next seed pattern is read, 608. The position of the actuator and/or micro actuators may be adjusted as necessary for position error compensation. This sequence of reading the seed pattern, writing a servo pattern, and position error compensation continues 610, in a substantially continuous manner, through the end of the seed pattern.

With no further seed pattern to act upon 610, the MDW servo head continues to servo write the remainder of the disk utilizing the previously written servo pattern as its base for subsequent servo pattern writings. Specifically, the read transducer of the MDW servo head reads the existing servo pattern 612 which provides a reference position (REF) for the write transducer of the MDW servo head. The write transducer writes another servo pattern 614 while providing an actual position (POS) of the write transducer. The position feedback loop 700 of FIG. 7 once again utilizes REF and POS to determine a position error signal (PES) enabling the controller to adjust the position of the MDW servo head, responsive to the PES, before the next servo pattern is read, 616. The position of the actuator and/or micro actuator may be adjusted as necessary for position error compensation. This sequence of reading the servo pattern, writing a servo pattern, and position error compensation continues, in a substantially continuous matter, until the entire disk has been servo written, 618. In this example configuration, the actuator of the of the MDW is substantially, continuously spiraling during track writing as opposed to stepping which provides a benefit for track-spacing and step-settle dynamics (e.g., a transient response is not present when the actuator continuously spirals versus starts and stops).

It should be noted that with regard to the MDW of the present disclosure, each of the multiple servo heads in the actuator assembly is provided with its own dedicated, simultaneously operating, control loop 600, operating in accordance with the flow chart of FIG. 6, enabling each MDW servo head with the ability to accommodate, via position error compensation, the unique surface of each disk upon which the head is writing a servo track. As such, if there are six MDW servo heads there be six control loops, twelve MDW servo heads with twelve control loops, etc. However, as the main actuator of the MDW may have difficulty responding to the multiple control loops, it may be desirable to designate one of the MDW micro actuator/actuator servo control system loops 600 as a master loop for control of the main actuator. Alternatively, the MDW coarse actuator may use the PES of the previously written pattern, the encoder reference, or both.

Figure 7:
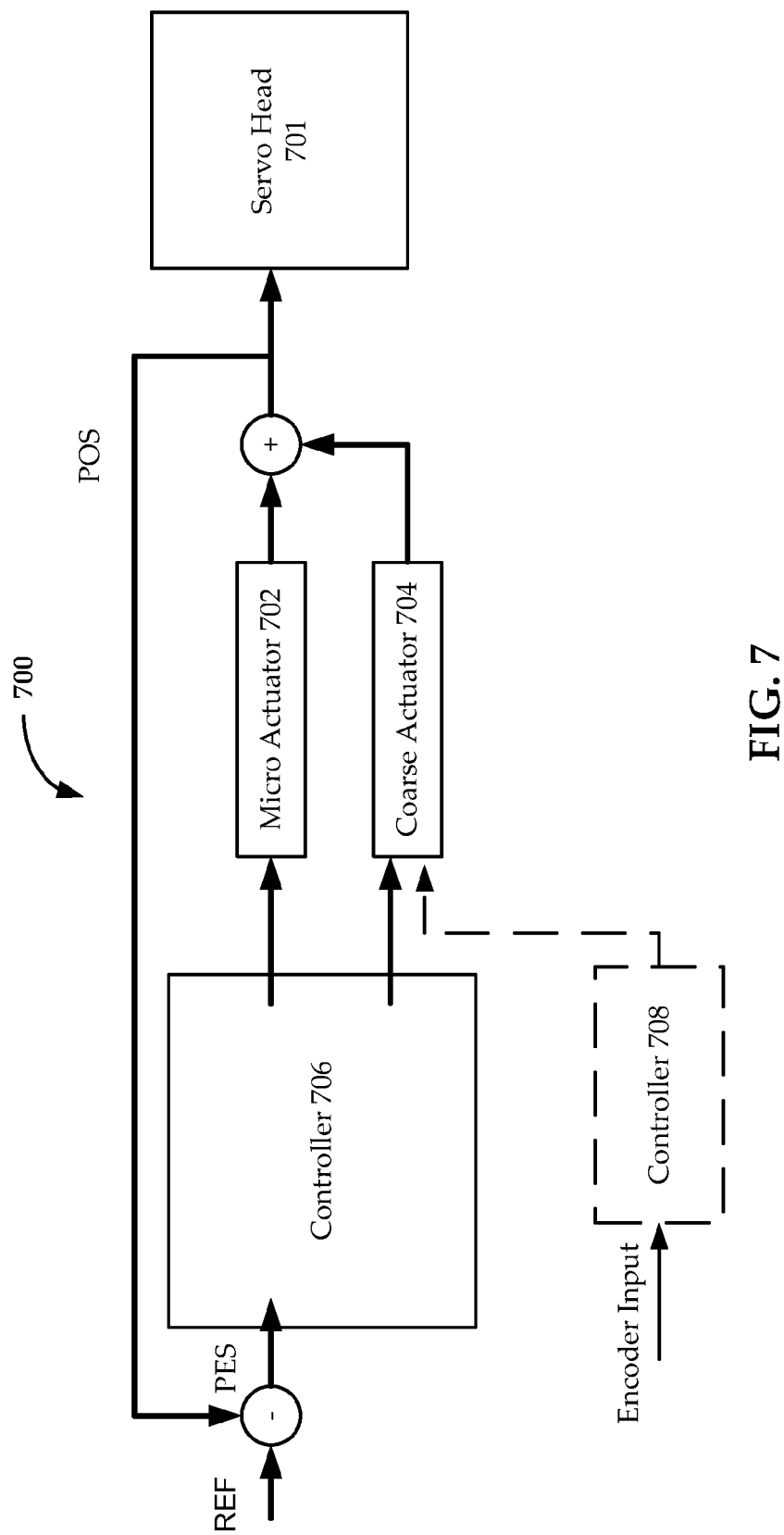
FIG. 7 is a position feedback loop of an MDW in accordance with an example embodiment.

It should further be noted, with reference to FIG. 7, that the positioning control of the coarse actuator 704 may be controlled as described above using the PES of the previously written pattern or it may, alternatively, be controlled utilizing controller 708 and an encoder input indicating position of the servo head 701, or be controlled using the combination of PES and encoder.

The MDW micro actuator/actuator servo control system may be implemented with any appropriate combination of electronics, hardware and software, fir example, compensators, filters (e.g., low-pass, notch, lead-lag, etc.), amplifiers, coded logic, etc. When using PZT transducers as the micro actuator, the positioning correction of the PZTs may be obtained through the variance of a voltage applied to the PZTs; the PZTs can either be poled in the opposite or similar sign, depending on the controller circuitry.

Systems, devices or methods disclosed herein may include one or more of the features, structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A system comprising:
a disk writer servo head configured:
  to be positioned by a micro actuator; and
  to substantially, continuously alternate between reading a first servo pattern establishing a first position of the disk writer servo head and writing a second servo pattern establishing a second position of the disk writer servo head until a disk is substantially completely servo written; and
a controller configured to control operation of the disk writer servo head and to compare the first position and the second position to establish a position error, the micro actuator configured to reposition the disk writer servo head in response to the position error prior to a next reading.

2. The system of claim 1, wherein the first servo pattern comprises a seed pattern.

3. The system of claim 1, wherein the seed pattern is written by the disk writer servo head.

4. The system of claim 1, wherein the system comprises a plurality of disk writer servo heads.

5. The system of claim 4, wherein each of the plurality of disk writer servo heads, substantially simultaneously as the other of the plurality of disk writer servo heads, alternates between reading a first servo pattern and writing a second servo pattern, and wherein each of plurality of disk writer servo heads is individually repositioned in response its own position error prior to the next reading of the first servo pattern.

6. The system of claim 1, wherein the disk writer servo head is additionally configured to be positioned by an actuator.

7. The system of claim 6, wherein the micro actuator is configured to provide fine, cross-track repositioning of the disk writer servo head and the actuator is configured to provide coarse cross-track repositioning of the disk writer servo head.

8. The system of claim 1, wherein:
the disk writer servo head is configured to be positioned by an actuator and the micro actuator; and
the controller is configured to control the actuator to continuously spiral during servo pattern writing.

9. A method comprising:
controllably moving a disk writer servo head using an actuator and a micro actuator;
alternating, without delay, between reading a first servo pattern with the disk writer servo head and writing a second servo pattern with the disk writer servo head until a disk has been substantially completely servo written, wherein the reading establishes a first position of the disk writer servo head and the writing establishes a second position of the disk writer servo head;
comparing the first position to the second position to establish a position error; and
repositioning the disk writer servo head using at least the micro actuator in response to the position error prior to the next reading.

10. The method of claim 9, wherein the repositioning is performed with an actuator and the micro actuator, wherein the micro actuator provides fine cross-track repositioning and the actuator provides coarse cross-track repositioning of the disk writer servo head.

11. The method of claim 9, wherein the method of claim 9 is performed substantially, simultaneously by a plurality of disk writer servo heads in a multi-disk writer.

12. The method of claim 9, wherein the first servo pattern comprises a seed pattern.

13. The method of claim 12, wherein the seed pattern is written by the disk writer servo head.

14. The method of claim 9, wherein the actuator continuously spirals during servo pattern writing.

15. A system comprising:
a plurality of disk writer servo heads in a multi-disk writer, each of the plurality of disk writer servo heads configured to:
substantially simultaneously be positioned by a respective micro actuator; and
substantially simultaneously and substantially continuously, alternate between reading a first servo pattern and writing a second servo pattern until a disk, respective to each of the disk writer servo heads, has been substantially completely servo written, wherein the reading establishes a first position of the respective disk writer servo head and the writing establishes a second position of the respective disk writer servo head;
a controller configured to control operation of the plurality of disk writer servo heads and to compare the first position and second position to establish a position error for each of the respective disk writer servo heads, the micro actuator configured to reposition its respective disk writer servo head in response to the position error prior to a next reading.

16. The system of claim 15, wherein the second servo pattern subsequently becomes the first servo pattern.

17. The system of claim 15, wherein the plurality of disk writer servo heads are configured to be substantially, simultaneously positioned by a single actuator.

18. The system of claim 17, wherein the single actuator provides coarse positioning of the plurality of disk writer servo heads and the plurality of micro actuators provide fine positioning to each of their respective disk writer servo heads.

19. The system of claim 15, wherein each of the micro actuators comprises a pair of piezo electric transducers.

20. The system of claim 15, wherein the first servo pattern comprises a seed pattern.

21. The system of claim 20, wherein the seed pattern is written by the disk writer servo heads.

22. The system of claim 15, wherein:
the plurality of disk writer servo heads are coupled to a single actuator in the multi-disk writer; and
the controller is configured to control the single actuator to continuously spiral during servo pattern writing.

* * * * *